(12) United States Patent
MacInnis

(10) Patent No.: US 9,596,498 B2
(45) Date of Patent: *Mar. 14, 2017

(54) MONITOR WITH CONVERSION CAPABILITY FOR PORTABLE MEDIA PLAYER

(75) Inventor: Alexander MacInnis, Ann Arbor, MI (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/155,346

(22) Filed: Jun. 7, 2011

(65) Prior Publication Data

US 2011/0299602 A1 Dec. 8, 2011

Related U.S. Application Data

(63) Continuation of application No. 12/179,741, filed on Jul. 25, 2008, now Pat. No. 7,961,747.

(60) Provisional application No. 60/952,727, filed on Jul. 30, 2007.

(51) Int. Cl.
| | |
|---|---|
| *H04W 72/04* | (2009.01) |
| *H04N 21/41* | (2011.01) |
| *H04N 21/436* | (2011.01) |
| *H04N 21/4402* | (2011.01) |
| *H04N 21/462* | (2011.01) |

(52) U.S. Cl.
CPC ... *H04N 21/4126* (2013.01); *H04N 21/43615* (2013.01); *H04N 21/4402* (2013.01); *H04N 21/4621* (2013.01)

(58) Field of Classification Search
CPC .... H04L 12/54; H04L 49/252; H04L 2012/54
See application file for complete search history.

(56) References Cited

U.S. PATENT DOCUMENTS

| | | | | | |
|---|---|---|---|---|---|
| 5,909,638 | A | * | 6/1999 | Allen | 725/146 |
| 6,753,852 | B1 | * | 6/2004 | Wen-Hsiang | 345/169 |
| 6,757,481 | B1 | * | 6/2004 | Nazarian et al. | 386/350 |
| 7,555,006 | B2 | * | 6/2009 | Wolfe et al. | 370/465 |
| 8,150,937 | B2 | * | 4/2012 | Ng et al. | 709/217 |
| 8,401,071 | B2 | * | 3/2013 | Youn et al. | 375/240.01 |
| 8,718,147 | B2 | * | 5/2014 | Hickey et al. | 375/240.23 |
| 2002/0043151 | A1 | * | 4/2002 | Hikawa | 84/609 |
| 2002/0046404 | A1 | * | 4/2002 | Mizutani | 725/58 |
| 2003/0081851 | A1 | * | 5/2003 | Sadeh | 382/250 |
| 2003/0093804 | A1 | * | 5/2003 | Chang et al. | 725/95 |
| 2003/0163811 | A1 | * | 8/2003 | Luehrs | H04N 5/44543 725/25 |

(Continued)

*Primary Examiner* — Hassan Phillips
*Assistant Examiner* — Prenell Jones
(74) *Attorney, Agent, or Firm* — Foley & Lardner LLP

(57) ABSTRACT

Presented herein are system(s), method(s), and apparatus for a monitor with conversion capabilities for transferring data to a portable media player. In one embodiment, a monitor is presented for displaying video data. The monitor comprises at least one input, a screen, an encoder, a memory, and an interface. The at least one input receives decompressed video data. The screen displays the decompressed video data. The encoder encodes the decompressed video data. The memory stores the encoded decompressed video data. The interface transfers the encoded decompressed video data to another memory removable from the interface.

20 Claims, 5 Drawing Sheets

(56) References Cited

U.S. PATENT DOCUMENTS

| | | | |
|---|---|---|---|
| 2004/0088180 A1* | 5/2004 | Akins, III | H04N 7/17318 |
| | | | 709/217 |
| 2005/0066083 A1* | 3/2005 | Chan et al. | 710/52 |
| 2005/0091696 A1* | 4/2005 | Wolfe et al. | 725/116 |
| 2005/0192052 A1* | 9/2005 | Tenhunen | 455/557 |
| 2005/0286862 A1* | 12/2005 | Cho | 386/46 |
| 2006/0026629 A1* | 2/2006 | Harris et al. | 725/32 |
| 2006/0034326 A1* | 2/2006 | Anderson et al. | 370/466 |
| 2006/0070108 A1* | 3/2006 | Renkis | 725/105 |
| 2006/0085534 A1* | 4/2006 | Ralston et al. | 709/223 |
| 2006/0098958 A1* | 5/2006 | Ohmori et al. | 386/125 |
| 2006/0101497 A1* | 5/2006 | Hirt | G01S 5/0018 |
| | | | 725/81 |
| 2006/0123126 A1* | 6/2006 | Kim et al. | 709/228 |
| 2006/0150221 A1* | 7/2006 | Chan | 725/81 |
| 2006/0177198 A1* | 8/2006 | Jarman et al. | 386/95 |
| 2006/0188096 A1* | 8/2006 | Aguilar | 380/200 |
| 2006/0282874 A1* | 12/2006 | Ito et al. | 725/139 |
| 2007/0025273 A1* | 2/2007 | Chung | 370/254 |
| 2007/0047659 A1* | 3/2007 | Aleksic | 375/240.25 |
| 2007/0058643 A1* | 3/2007 | Perley et al. | 370/401 |
| 2007/0092149 A1* | 4/2007 | Sung | H04N 19/159 |
| | | | 382/239 |
| 2007/0214213 A1* | 9/2007 | Fillebrown et al. | 709/203 |
| 2007/0241990 A1* | 10/2007 | Smith et al. | 345/5 |
| 2007/0252834 A1* | 11/2007 | Fay | 345/428 |
| 2007/0286289 A1* | 12/2007 | Arai et al. | 375/240.26 |
| 2008/0040757 A1* | 2/2008 | Romano et al. | 725/81 |
| 2008/0101421 A1* | 5/2008 | Gordon | H04N 21/23424 |
| | | | 370/535 |
| 2008/0120676 A1* | 5/2008 | Morad et al. | 725/127 |
| 2008/0165280 A1* | 7/2008 | Deever et al. | 348/497 |
| 2008/0198931 A1* | 8/2008 | Chappalli et al. | 375/240.16 |
| 2008/0320596 A1* | 12/2008 | Wang et al. | 726/26 |
| 2009/0268808 A1* | 10/2009 | Li et al. | 375/240.02 |
| 2009/0305680 A1* | 12/2009 | Swift et al. | 455/414.1 |
| 2010/0138489 A1* | 6/2010 | Corley et al. | 709/203 |
| 2012/0087416 A1* | 4/2012 | Ross | H04N 21/23406 |
| | | | 375/240.25 |
| 2012/0233654 A1* | 9/2012 | McDonald et al. | 725/116 |
| 2013/0039433 A1* | 2/2013 | Ralston | G11B 27/034 |
| | | | 375/240.26 |
| 2014/0006556 A1* | 1/2014 | Shapiro et al. | 709/217 |

\* cited by examiner

MONITOR WITH CONVERSION CAPABILITY FOR PORTABLE MEDIA PLAYER

RELATED APPLICATIONS

This application is a continuation of and claims priority to "Monitor with Conversion Capability for Portable Media Player", U.S. patent application Ser. No. 12/179,741 filed Jul. 25, 2008 that claims priority to "MONITOR WITH CONVERSION CAPABILITY FOR PORTABLE MEDIA PLAYER", Provisional Application for U.S. Patent Ser. No. 60/952,727, filed Jul. 30, 2007 by MacInnis, and each of the foregoing applications are incorporated herein by reference in its entirety for all purposes. This application is also related to "INTEGRATED CIRCUIT WITH CONVERSION CAPABILITY FOR PORTABLE MEDIA PLAYER", Provisional Application for U.S. Patent Ser. No. 60/952,731, filed Jul. 30, 2007 by MacInnis, and the foregoing application is incorporated herein by reference in its entirety for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Typical current TVs have the ability to receive, process and display audio-video (A/V) signals received from a variety of sources. Received signals may be analog, such as NTSC, or digital such as ATSC with MPEG-2 digital video and Dolby Digital audio. Some TVs can receive uncompressed digital or analog A/V input, e.g., via component analog or HDMI inputs.

Portable media players are becoming popular. Some portable media players (PMP) can display video. Video content for PMPs is typically downloaded via the Internet. Users may wish to record content received at their home TV and copy to their PMPs, using the content of their choice, at very high speeds, and without having to pay to buy an extra copy of content to which they already have the rights to watch.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to system(s), method(s), and apparatus for monitor(s) with conversion capabilities for personal media players, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF THE INVENTION

Figure 1:
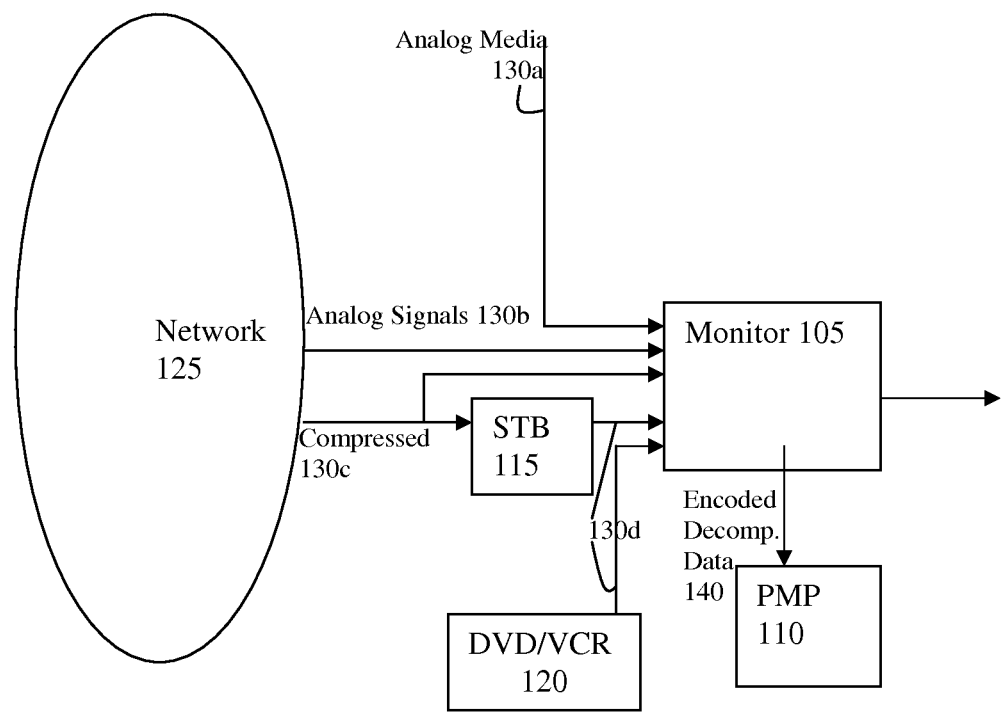
FIG. 1 is a block diagram of an exemplary system for providing media in accordance with an embodiment of the present invention.

Referring now to FIG. 1, there is illustrated a block diagram of an exemplary system 100 for providing media 105 in accordance with an embodiment of the present invention. The system 100 comprises a monitor 105, and a portable media player 110. The monitor 105 receives and presents media on a screen and speakers. Additionally, the monitor 105 encodes the media 130 to a particular format that is suitable for storage in the portable media player 110.

The media 130 can be video and/or audio data and can be received as analog media 130a received over radio waves. Alternatively, the media 130b can comprise media received over a network 125, such as analog signals 130b over an analog cable network. Additionally, the media can be compressed to reduce bandwidth. The compressed data 130c can be received by a set top box 115. The set top box 115 can include circuitry for decompressing the data, thereby resulting in decompressed data 130d. Additional circuitry can be included to prepare the decompressed data for display by scaling and rasterizing. Alternatively, the compressed data 130c can be decompressed by circuitry integrated into the monitor 105. Additionally, the monitor 105 can receive media as either analog signals or decompressed data 130d from a DVD/VCR player 120. In certain embodiments of the present invention, the monitor may receive uncompressed video and audio via a digital interface, such as DVI or HDMI, or a wireless interface.

The monitor 105 receives the analog signals 130a or the decompressed data 130d and encodes the analog signals 130a or the decompressed data 130d. Where the monitor 105 receives compressed data 130c, internal circuitry transcodes the compressed data 130c, thereby resulting in compressed data in a format suitable for a different device. This transcode may involve decompressing compressed data 130c. Additionally, the monitor 105 may include circuitry for preparing the decompressed data for display by scaling and rasterizing the decompressed data. Accordingly, the term "decompressed data" will now be understood to include, for example, reconstructed data from compressed data, uncompressed data, analog signals, uncompressed digital signals, scaled data, rasterized data, and data that is not compressed using lossy compression. The term "decompressed video data" will now be understood to include, for example, reconstructed video data from compressed video data, uncompressed video data, analog video signals, digital video signals, scaled video data, rasterized video data, and video data that is not compressed using lossy compression. The term "video data" shall be understood to cover any video in any form.

The monitor 105 presents the decompressed data. Where the decompressed data is decompressed video data, the monitor 105 presents the decompressed video data on a screen. Where the decompressed data is audio data, the monitor 105 presents the audio data using speakers. Additionally, the monitor 105 includes circuitry integrated therein to encode the decompressed data into a format, encoded data 140, suitable for use by a personal media player 110, or to transcode compressed data 130c into a format suitable for use by a personal media player 100.

The portable media player 110 presents media on an integrated screen and/or via speakers and is generally designed to be routinely transported or carried on the person. The portable media player 115 can comprise, for example, an iPOD™, a cell phone, a personal digital assistant (PDA), or a Palm Top.

Since the portable media player 115 is generally designed to be routinely transported or carried on the person, the portable media player 115 can use a particular compression format for storing the media played by the portable media player to reduce the amount of memory needed to store the media. Additionally, portable media players 115 often have specific requirements for compressed formats in order to simplify the processes of decoding and presenting video. Their small size, low cost and battery power may motivate this requirement.

In certain embodiments of the present invention, the portable media player 115 can be connected to the monitor 105. The monitor 105, upon detecting the connection between the monitor 105 and portable media player 115, can transfer the encoded data 140 to the portable media player 115. Alternatively the monitor may create an encoded or transcoded stream for the PMP after the PMP is connected, and transfer the stream without first storing it in a memory. Alternatively, the monitor 105 and the portable media player 115 can be equipped to detect a condition wherein the portable media player 115 is within local radio proximity of the monitor 105, and transfer the encoded data 140 to the portable media player 115 over a radio interface.

Figure 2:
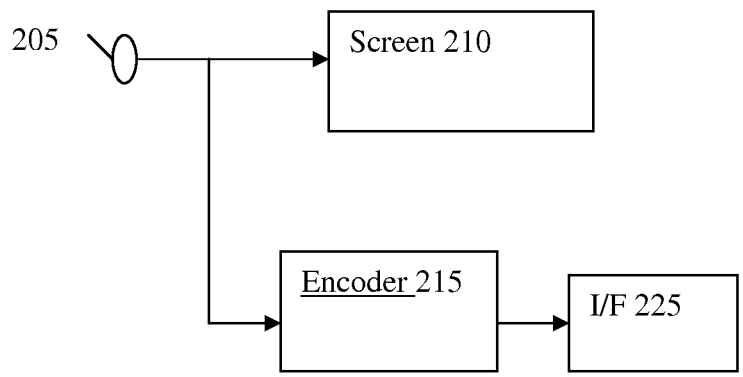
FIG. 2 is a block diagram of an exemplary monitor in accordance with an embodiment of the present invention.

Referring now to FIG. 2, there is illustrated a block diagram of an exemplary monitor 200 in accordance with an embodiment of the present invention. The monitor 200 comprises input(s) 205, a screen 210, a encoder 215, and an interface 225. The input(s) 205 receives decompressed video data. The screen 210 displays the decompressed video data. The encoder 215 encodes the decompressed video data. The interface 225 is operable to transfer the encoded video data to another portable media player.

It is noted that the input(s) 205 can either be externally accessible or internally integrated. For example, in certain embodiments of the present invention, the monitor 200 receives compressed data. Additional circuitry in the monitor 200 can decompress the compressed data, thereby resulting in the decompressed data.

In certain embodiments of the present invention, the monitor 200 can include circuitry for further preparing the decompressed video data for display by scaling and rasterizing the decompressed data.

The encoder 215 encodes the decompressed data into a format that is suitable for the portable media player 115. The encoder 215 can encode the decompressed data either before or after scaling and rasterizing. In certain embodiments of the present invention, the encoder 215 can compress the decompressed data using a variety of compression techniques, including but not limited to, motion compensation, and entropy coding.

The interface 225 is operable to transfer the data to the personal media player 110. In certain embodiments of the present invention, the interface 225 can be connectable to the personal media player 110, and upon detecting the connection to the personal media player 110, the interface can transfer the data to the personal media player 110. In certain embodiments of the present invention the interface 225 can comprise a Universal Serial Bus Port.

In certain embodiments of the present invention, the interface 225 can transfer the data to the personal media player 110 over a wireless interface. When the interface 225 detects that the personal media player 110 is in proximity to the monitor 105, the interface 225 can transmit the data to the personal media player 110 using radio signals.

In certain embodiments of the present invention, memory between the encoder 215 and the interface 225 can store or buffer the data prior to transfer to the personal media player 110. After the encoder 215 encodes the data, the encoder data can be written to the memory. The memory holds the stored data for transfer to the personal media player 110. The memory may be solid state memory or memory with moving parts, such as a hard disk drive.

In certain embodiments of the present invention, the data can be transcoded from a first compression format to a second format, with or without decompressing the data. Accordingly, the term "encoding" shall be understood to include both coding uncoded data, as well as transcoding coded data, with or without first decoding.

Figure 3:
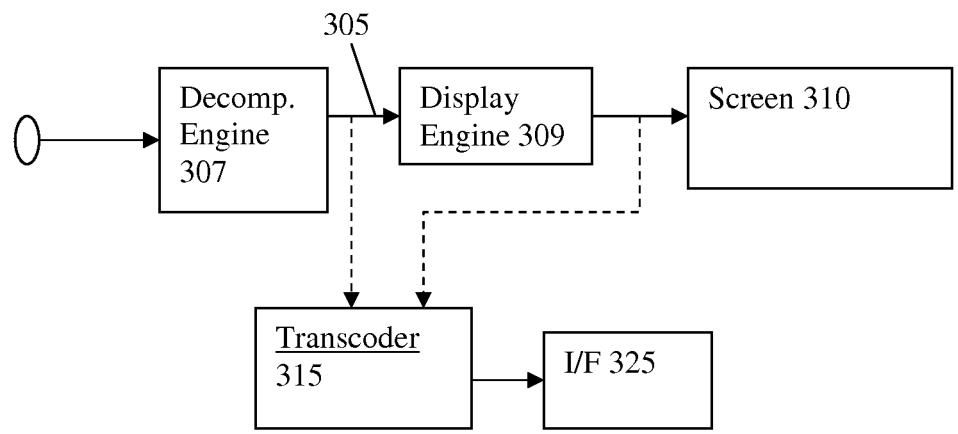
FIG. 3 is a block diagram of an exemplary monitor receiving compressed data in accordance with an embodiment of the present invention.

Referring now to FIG. 3, there is illustrated a block diagram of an exemplary monitor 300 in accordance with an embodiment of the present invention. The monitor 300 comprises input(s) 305, a decompression engine 307, a display engine 309, a screen 310, a transcoder 315, and an interface 325. The input(s) 305 receives compressed video data. The decompression engine 307 decompresses the compressed video data, thereby resulting in decompressed video data. The display engine 309 prepares the decompressed video data for display on the screen 310 by scaling and rasterizing the decompressed data. The screen 310 displays the decompressed video data.

The transcoder 315 transcodes the decompressed video data. In certain embodiments of the present invention, the transcoder 315 can transcode the video data after the display engine 309 scales and rasterizes the data. Alternatively, the transcoder 315 can transcode the decompressed video data prior to scaling and rasterization. Alternatively, the transcoder transcodes the compressed video data from a first compression format to a second compression format, resulting in compressed data in a format that is suitable for a separate device such as a portable media player.

In certain embodiments of the present invention, the transcoder 315 can comprise a compression engine 330 for compressing the decompressed video data. The compression engine 330 can compress the data using a variety of compression standards such as MPEG-2, H.264 or VC-1. The interface 325 is operable to transfer the encoded decompressed video data to the portable media player.

In certain embodiments of the present invention, memory between the transcoder 315 and the interface 325 can store or buffer the data prior to transfer to the personal media player 110. After the transcoder 315 transcodes the data, the transcoded data can be written to the memory. The memory holds the stored data for transfer to the personal media player 110.

Figure 4:
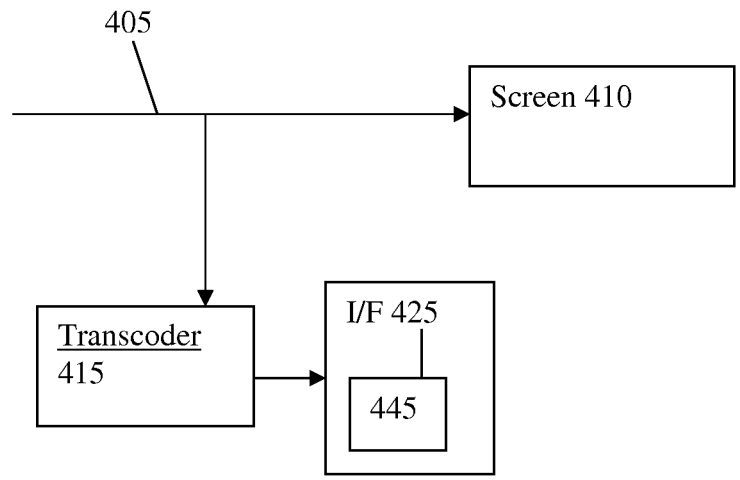
FIG. 4 is a block diagram of an exemplary monitor operable to transfer data over a wireless connection.

Referring now to FIG. 4, there is illustrated a block diagram of an exemplary monitor 105 operable to transfer video data over a wireless interface in accordance with an embodiment of the present invention. The monitor 400 comprises input(s) 405, a screen 410, a transcoder 415, and an interface 425. The input(s) 405 receives decompressed video data. The screen 410 displays the decompressed video data. The transcoder 415 transcodes the decompressed video data. The interface 425 is operable to transfer the encoded video data to a portable media player over a wireless connection.

The interface 425 comprises a transceiver 440. The receiver 445 can be operable to detect the presence of the portable media player 125 in the proximity of the monitor 105. In certain embodiments, when the portable media player 125 is brought into the proximity of the monitor 105, the transceiver 445 receives a signal indicating that the portable media player 125 is in proximity.

In certain embodiments of the present invention, the monitor 105 can be a node in a wireless local area network. When the portable media player 125 comes into the coverage area of the wireless local area network, the wireless local area network can send a signal to the monitor 105 indicating that the portable media player 125 is in the network.

Alternatively, the portable media player 125 can send a signal directly to the monitor 105. The signal is received by the transceiver 445. Responsive thereto, the transceiver 445 transmits the data from the memory 420 to the portable media player 125.

In certain embodiments of the present invention, memory between the transcoder 415 and the interface 425 can store or buffer the data prior to transfer to the personal media player 110. After the transcoder 415 transcodes the data, the transcoded data can be written to the memory. The memory holds the stored data for transfer to the personal media player 110. In certain embodiments of the present invention, decompression engine(s) decompress compressed audio and video data. Transcoding can include compression and the transcoder(s) can comprise an audio encoder for compressing the audio data and a video encoder for compressing the video data.

Figure 5:
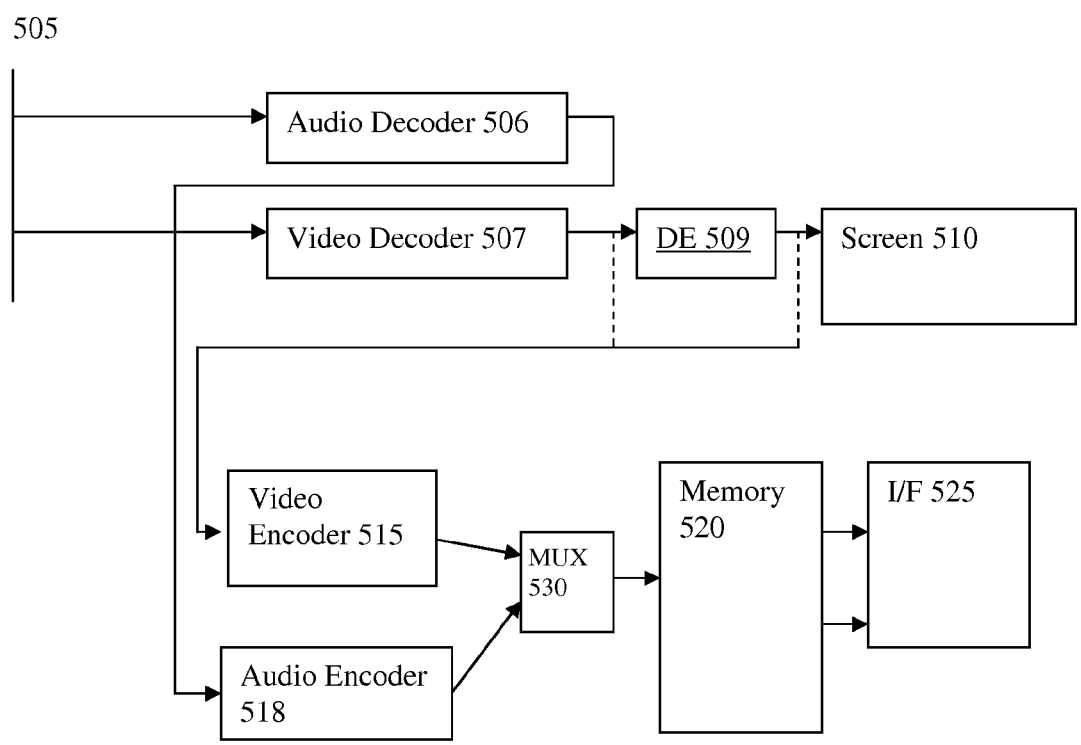
FIG. 5 is a block diagram of an exemplary monitor operable to transfer video and audio data.

Referring now to FIG. 5, there is illustrated a block diagram of an exemplary monitor in accordance with an embodiment of the present invention. The monitor 500 comprises input(s) 505, an audio decoder 506, a video decompression engine 507, a display engine 509, a screen 510, a video encoder 515, an audio encoder 518, a memory 520, and an interface 525. The input(s) 505 receives compressed video and audio data. The video decompression engine 507 decompresses the compressed video data, thereby resulting in decompressed video data. The display engine 509 prepares the decompressed video data for display on the screen 510 by scaling and rasterizing the decompressed data. The screen 510 displays the decompressed video data.

The audio decoder 506 decompresses the compressed audio data and provides the decompressed audio data for output. The audio encoder 518 compresses the decompressed audio data and writes the compressed audio data to the memory 520.

The video encoder 515 encodes the decompressed video data. In certain embodiments of the present invention, the video encoder 515 can encode the video data after the display engine 509 scales and rasterizes the data. Alternatively, the encoder 515 can encode the decompressed video data prior to scaling and rasterization.

It is noted that the audio encoder 506 and the video encoder 515 do not necessarily compress according to the same standard utilized for the data at the input.

A multiplexer 530 multiplexes the audio and video data during transfer. In certain embodiments of the present invention, the multiplexer 530 can comprise a transport processor.

In certain embodiments of the present invention, video and audio transcoders transcode compressed audio and video data that are compressed in accordance with a standard suitable for the monitor into another compression standard that is suitable for the portable media player. For example, the video transcoder could transcode video data compressed in accordance with Advanced Video Coding (also known as MPEG-4, Part 10, and H.264) to MPEG-2.

Figure 6:
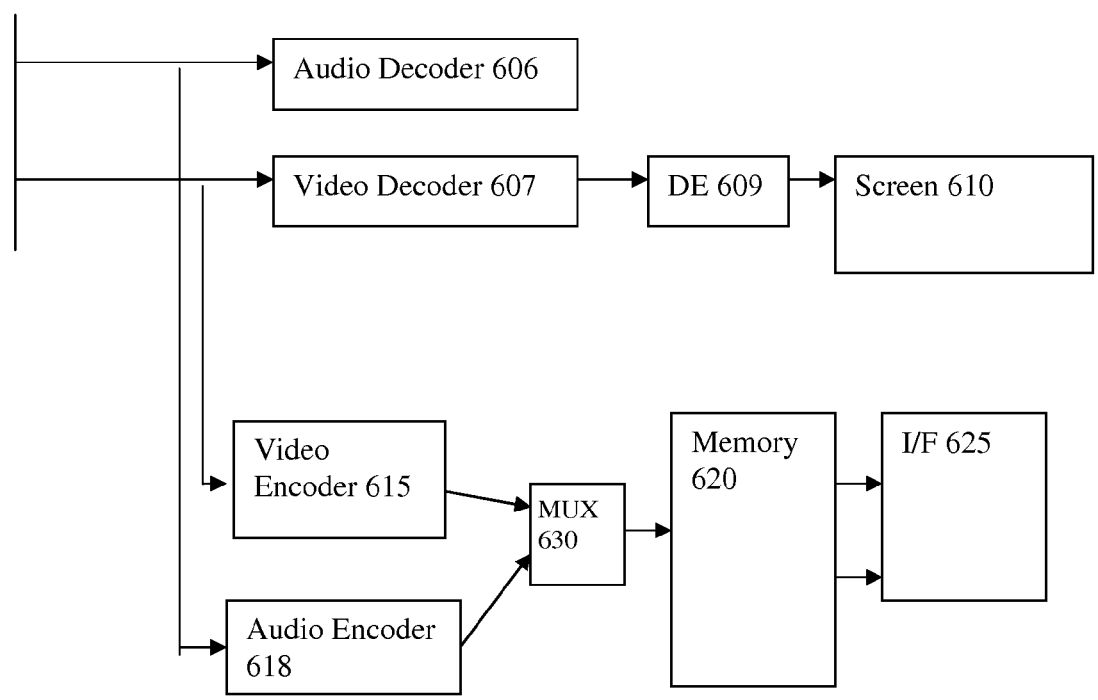
FIG. 6 is a block diagram of another exemplary monitor operable to transfer video and audio data.

Referring now to FIG. 6, there is illustrated a block diagram of an exemplary monitor in accordance with an embodiment of the present invention. The monitor comprises input(s) 605, an audio decoder 606, a video decompression engine 607, a display engine 609, a screen 610, a video transcoder 615, an audio transcoder 618, a memory 620, and an interface 625. The input(s) 605 receives compressed video and audio data. The video decompression engine 607 decompresses the compressed video data, thereby resulting in decompressed video data. The display engine 609 prepares the decompressed video data for display on the screen 610 by scaling and rasterizing the decompressed data. The screen 610 displays the decompressed video data.

The audio decompression engine 606 decompresses the compressed audio data and provides the decompressed audio data for output. The audio transcoder 518 transcodes the compressed audio data into a format suitable for the portable media player and writes the transcoded audio data to the memory 520. The video encoder 515 transcodes the compressed video data to a format suitable for the portable media player.

A multiplexer 630 multiplexes the audio and video data during transfer. In certain embodiments of the present invention, the multiplexer 630 can comprise a transport processor.

Figure 7:
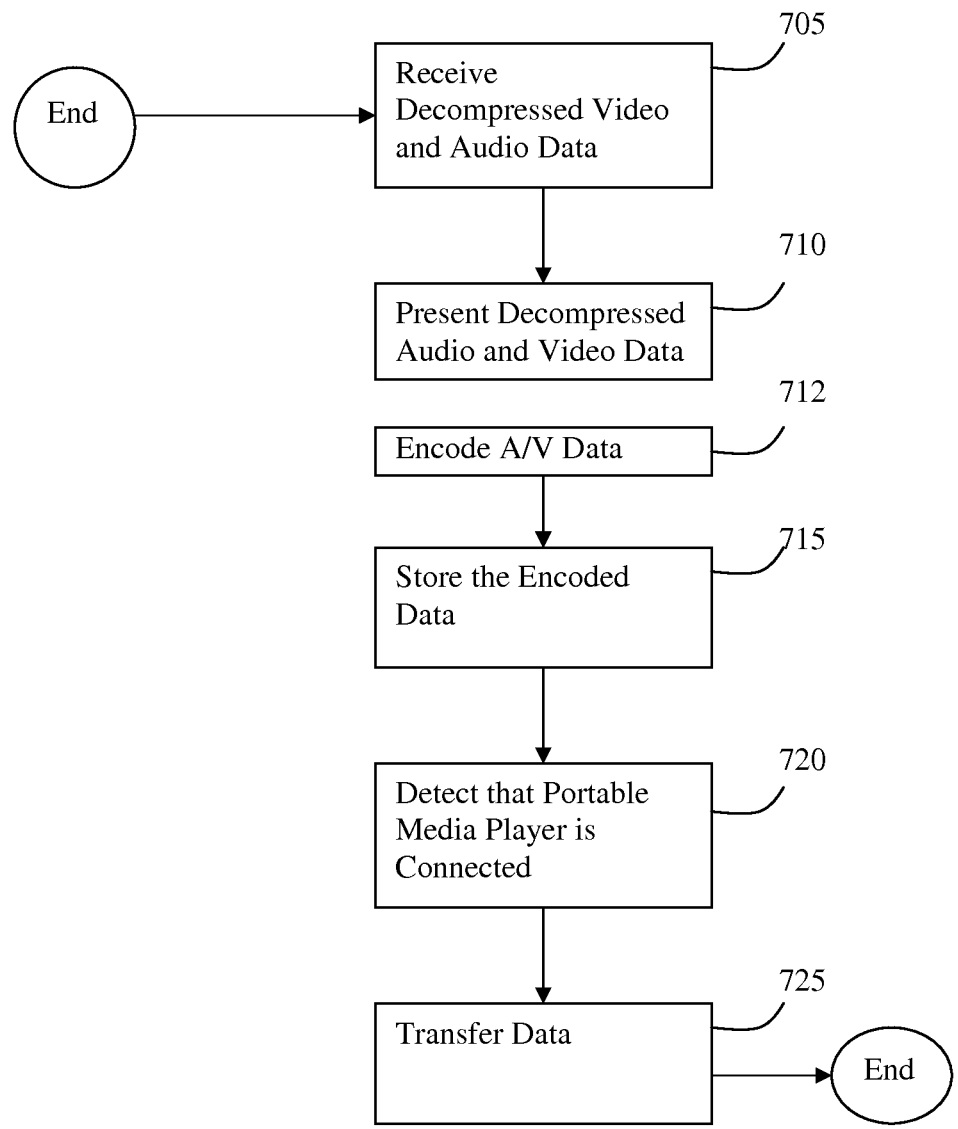
FIG. 7 is a flow diagram for transferring data in accordance with an embodiment of the present invention.

Referring now to FIG. 7, there is illustrated a flow diagram for transferring data to a portable media player in accordance with an embodiment of the present invention. At 705, the monitor 105 receives decompressed video and audio data. At 710 and 712, the decompressed video and audio data are presented and encoded. The decompression and presentation of the video and audio data generally can be contemporaneous with respect to each other. At 715, the memory stores the encoded data. At 720, the monitor detects that the portable media player 110 is connected, either electrically, or wirelessly, to the monitor 105. Upon detection, the monitor 625 transfers the data to the portable media player.

The systems as described herein may be implemented as a board level product, as a single chip, application specific integrated circuit (ASIC), or with varying levels of the systems integrated with other portions of the system as separate components. The degree of integration of the decoder system will primarily be determined by the speed and cost considerations.

Because of the sophisticated nature of modern processors, it is possible to utilize a commercially available processor, which may be implemented external to an ASIC implementation. Alternatively, if the processor is available as an ASIC core or logic block, then the commercially available processor can be implemented as part of an ASIC device wherein various operations are implemented in firmware.

While the invention has been described with reference to certain embodiments, it will be understood by those skilled in the art that various changes may be made and equivalents may be substituted without departing from the scope of the invention.

In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A monitor for displaying video data, the monitor comprising:
    an input configured to receive compressed video data;
    a video decompression engine operably connected to the input and configured to decompress the compressed video data to generate decompressed video data;
    a display operably connected to the video decompression engine and configured to display the decompressed video data;
    an encoder operably connected to the video decompression engine, the encoder being configured to identify a compressed format of a portable media device which is a separate device from the monitor and is in the proximity of the monitor, and the encoder being configured to encode the decompressed video data in accordance with an encoded video stream in the compressed format of the portable media device to generate encoded video data; and
    an interface operably connected to the encoder and configured to transfer the encoded video stream to the portable media device upon a detection of the portable media device in the proximity of the monitor.

2. The monitor of claim 1, wherein the interface comprises:
    a transceiver configured to transmit the encoded video data to the portable media device using radio waves.

3. The monitor of claim 2, wherein the transceiver is configured to transmit the encoded video data to the portable media device upon receipt of a signal indicating a presence of wireless connectivity between the monitor and the portable media device.

4. The monitor of claim 3, wherein the transceiver transmits the encoded video data to the portable media device over a wireless local area network.

5. The monitor of claim 1, wherein the encoder further comprises:
    a video encoder configured to compress the video data using motion compensation.

6. The monitor of claim 1, further comprising:
    a display engine configured to prepare the decompressed video data for display on the display, thereby resulting in rasterized video data; and
    wherein the encoder is configured to encode the rasterized video data.

7. The monitor of claim 1, wherein the interface comprises:
    a bus port connectable to the portable media device.

8. The monitor of claim 7, wherein the bus port further comprises:
    a high-definition multimedia interface (HDMI) port.

9. The monitor of claim 7, wherein the interface is configured to detect connection of the portable media device with the bus port and transmit the encoded video data to the memory of the portable media device after detecting connection of the portable media device to the bus port.

10. An apparatus comprising:
    an input configured to receive compressed video data;
    a video decompression engine operably connected to the input and configured to decompress the compressed video data to generate decompressed video data;
    a transcoder operably connected to the video decompression engine, the transcoder being configured to identify a compressed format of a portable media device which is a separate device from the apparatus and is in the proximity of the apparatus, and the transcoder being configured to transcode the decompressed video data in accordance with a transcoded video stream in the compressed format of the portable media device; and
    an interface operably connected to the transcoder to transfer the transcoded video stream to a memory of the portable media device upon a detection of the portable media device in the proximity of the apparatus.

11. The apparatus of claim 10, wherein the input receives compressed audio data, the apparatus further comprising:
    an audio transcoder configured to transcode the compressed audio data by decompressing the compressed audio data to generate decompressed audio data and recompressing the decompressed audio data to generate transcoded audio data; and
    wherein the interface transfers the transcoded audio data to the portable media device.

12. The apparatus of claim 11, further comprising a packetizer for packetizing the audio data and packetizing the video data.

13. A method comprising:
    receiving, by an input in a display device, compressed video data in accordance with a data format;
    decompressing the compressed video data in a video decompression engine operably connected to the input to generate decompressed video data;
    displaying the decompressed video data on a display operably connected to the video compression engine;
    identifying a compressed format of a portable media device which is a separate device from the display device and is in the proximity of the display device;
    transcoding the compressed video data in a transcoder to generate transcoded video data in accordance with the identified compressed format of the portable media device in the proximity of the display device; and
    transferring the transcoded video data from the display device to a memory of the portable media device via an interface of the display device upon a detection of a connection between the interface and the portable media device.

14. The method of claim 13, wherein the transcoded video data is transferred to the memory via wireless communication via the interface.

15. The method of claim 13, further comprising:
    multiplexing audio data and the video data via a multiplexer; and
    packetizing the audio data and the video data via a packetizer.

16. The method of claim 13, further comprising:
    while displaying the decompressed video data on the display of the display device, transcoding the compressed video data in the transcoder of the display device to generate the transcoded video data in accordance with the identified compressed format of the portable media device in the proximity of the display device.

17. The apparatus of claim 10, further comprising:
a display engine configured to prepare the decompressed video data for display by scaling and rasterizing the decompressed video data; and
wherein the transcoder is configured to transcode the decompressed video data before or after the scaling and rasterizing of the decompressed video data.

18. The apparatus of claim 10, further comprising:
a display operably connected to the video decompression engine configured to display the decompressed video data.

19. The monitor of claim 1, wherein while the display of the monitor displays the decompressed video data, the encoder of the monitor encodes the decompressed video data in accordance with the encoded video stream in the compressed format of the portable media device in the proximity of the monitor.

20. The apparatus of claim 18, wherein while the display of the apparatus displays the decompressed video data, the transcoder of the apparatus transcodes the decompressed video data in accordance with the transcoded video stream in the compressed format of the portable media device in the proximity of the apparatus.

* * * * *